(12) United States Patent
Ericson

(10) Patent No.: US 7,348,995 B2
(45) Date of Patent: Mar. 25, 2008

(54) METHOD, APPARATUS AND COMPUTER PROGRAM PRODUCT FOR IMPLEMENTING PICTURE FORMAT CONVERSION TO X, Y PLOT

(75) Inventor: Richard Boyd Ericson, Rochester, MN (US)

(73) Assignee: International Business Machines Corporation, Armonk, NY (US)

(*) Notice: Subject to any disclaimer, the term of this patent is extended or adjusted under 35 U.S.C. 154(b) by 263 days.

(21) Appl. No.: 11/149,488

(22) Filed: Jun. 9, 2005

(65) Prior Publication Data

US 2006/0279581 A1    Dec. 14, 2006

(51) Int. Cl.
*G09G 5/00* (2006.01)
*G06T 11/20* (2006.01)

(52) U.S. Cl. .................. 345/603; 345/440; 345/619; 345/622; 345/625; 345/628

(58) Field of Classification Search ............... 345/603, 345/619, 622, 625, 628, 440; 708/204
See application file for complete search history.

(56) References Cited

U.S. PATENT DOCUMENTS 4,868,785 A * 9/1989 Jordan et al. ............... 345/440
2003/0048932 A1* 3/2003 Zaleski ....................... 382/128

OTHER PUBLICATIONS

J.E. Silk, Silk Scientific Home Page, "Conver Scanned Images to Data with Un-SCAN-IT &Un-Scan-IT gel", pp. 1-4 and 1-2, http://www.silkscientific.com/.*
J.E. Silk, E.M. Wooley: "Converting scanned graphs to (x,y) data" American Laboratory ,Online! Feb. 1999 XP002273770 www.iscpubs.com/articles/a1/a9902sil.pdf, pp. 72, 74-75.*

* cited by examiner

*Primary Examiner*—Chante Harrison
(74) *Attorney, Agent, or Firm*—Joan Pennington

(57) ABSTRACT

A method, apparatus and computer program product are provided for implementing picture format conversion to X,Y plot for waveform comparisons. A picture file and user selected X,Y boundaries are received. Non-white pixels of the picture file between the user selected X,Y boundaries are converted to X,Y coordinate values in a selected format. The converted X,Y coordinate values are plotted.

4 Claims, 4 Drawing Sheets

METHOD, APPARATUS AND COMPUTER PROGRAM PRODUCT FOR IMPLEMENTING PICTURE FORMAT CONVERSION TO X, Y PLOT

FIELD OF THE INVENTION

The present invention relates generally to the data processing field, and more particularly, relates to a method, apparatus and computer program product for implementing picture format conversion to X,Y plot for waveform comparisons.

DESCRIPTION OF THE RELATED ART

Pictures of waveforms from oscilloscopes are often saved as a file in a picture format, such as BMP, GIF, JPEG, PNG, and the like. Often times, after taking a picture, some other data is needed that you may have forgotten to measure or did not need to measure at that point in time, such as slew rates, eye openings, cycle times, and the like. In order to get accurate measurements, it is usually required that you spend another day or more in the lab probing up a system, getting the system running, and taking needed measurements.

It is very useful to be able to overlay a picture of a waveform from actual hardware, and from a simulation of the hardware under test in order to visually see how well the correlation is between the two. While some oscilloscopes allow for some limited XY data to be saved of a single trace, often this is not possible, for example, for XY data of a picture of an eye or eye diagram. An eye diagram illustrates the value of the received signal as a function of the phase of a clock signal controlling the switching of the transmitted signal. Therefore, a problem exists in getting a good visual of the correlation between simulated eye diagrams, and measured eye diagrams.

A need exists for an effective mechanism for implementing picture format conversion to X,Y plot for waveform comparisons.

SUMMARY OF THE INVENTION

Principal aspects of the present invention are to provide a method, apparatus and computer program product for implementing picture format conversion to X,Y plot for waveform comparisons. Other important aspects of the present invention are to provide such method, apparatus and computer program product for implementing picture format conversion to X,Y plot for waveform comparisons substantially without negative effect and that overcome many of the disadvantages of prior art arrangements.

In brief, a method, apparatus and computer program product are provided for implementing picture format conversion to X,Y plot for waveform comparisons. A picture file and user selected X,Y boundaries are received. Non-white pixels of the picture file between the user selected X,Y boundaries are converted to X,Y coordinate values in a selected format. The converted X,Y coordinate values are plotted.

In accordance with features of the invention, the selected format for the converted X,Y coordinate values is provided for use with conventional plotting tools or programs, such as, raw data file (RAW) format for the program xplot and Common Simulation Data Format (CSDF) for the program aWaves.

BRIEF DESCRIPTION OF THE DRAWINGS

The present invention together with the above and other objects and advantages may best be understood from the following detailed description of the preferred embodiments of the invention illustrated in the drawings, wherein.

DETAILED DESCRIPTION OF THE PREFERRED EMBODIMENTS

Figure 1A:
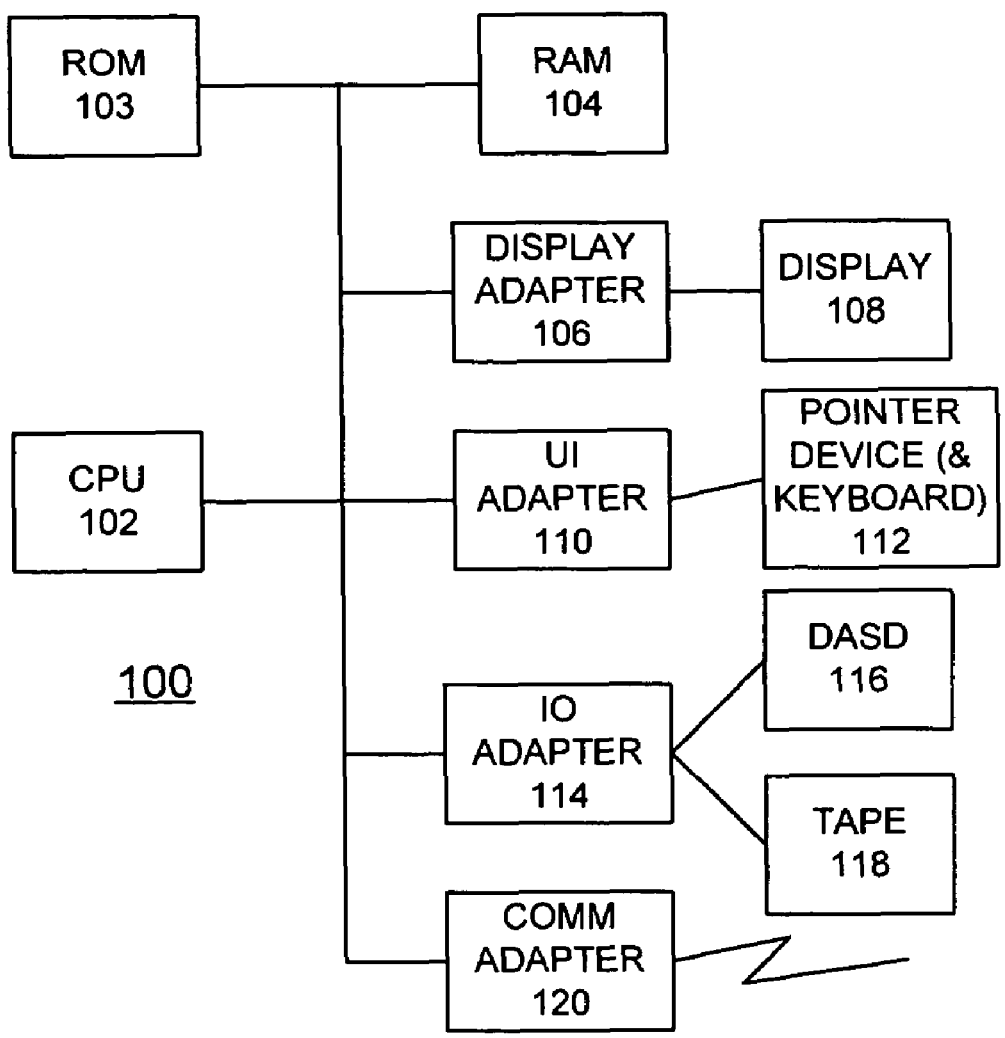
FIGS. 1A and 1B are block diagram representations illustrating a computer system and operating system for implementing picture format conversion to X,Y plot in accordance with the preferred embodiment.
Figure 1B:
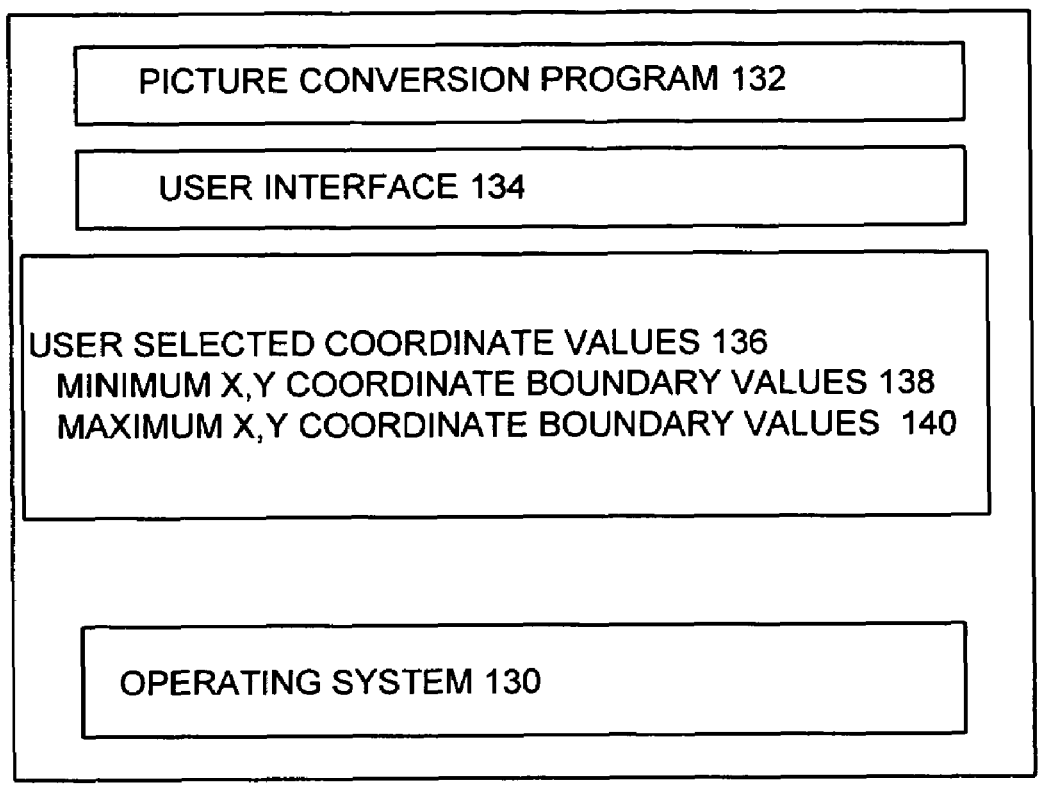

Having reference now to the drawings, in FIGS. 1A, and 1B, there is shown a computer or data processing system generally designated by the reference character 100 for implementing picture format conversion to X,Y plot in accordance with the preferred embodiment. As shown in FIG. 1A, computer system 100 includes a central processor unit (CPU) 102, a read only memory 103, a random access memory 104, a display adapter 106 coupled to a display 108. CPU 102 is connected to a user interface (UI) adapter 110 connected to a pointer device and keyboard 112. CPU 102 is connected to an input/output (10) adapter 114 connected to a direct access storage device (DASD) 116 and a tape unit 118. CPU 102 is connected to a communications adapter 120 providing a communications function.

Computer system 100 is shown in simplified form sufficient for understanding the present invention. The illustrated computer system 100 is not intended to imply architectural or functional limitations. The present invention can be used with various hardware implementations and systems and various other internal hardware devices. For example, instead of a single main processor 102, multiple main processors can be used.

As shown in FIG. 1B, computer system 100 includes an operating system 130, a picture conversion program 132 of the preferred embodiment, and a user interface 134. User selected coordinate values 136 including minimum X,Y coordinate boundary values 138 and maximum X,Y coordinate boundary values 140 are stored in accordance with the picture conversion methods of the preferred embodiment.

Various commercially available computers can be used for computer system 100, for example, an IBM personal computer or an IBM server computer. CPU 102 is suitably programmed by the picture conversion program 132 to execute the flowchart of FIG. 2 for implementing picture format conversion to X,Y plot for waveform comparisons in accordance with the preferred embodiment.

In accordance with features of the preferred embodiment, methods are provided that allow software to receive an input picture of a waveform and to generate and plot coordinate X,Y data for the received picture of the waveform. Effective visual correlation is enabled between measured and simulated waveform in accordance with the preferred embodiment.

Figure 2:
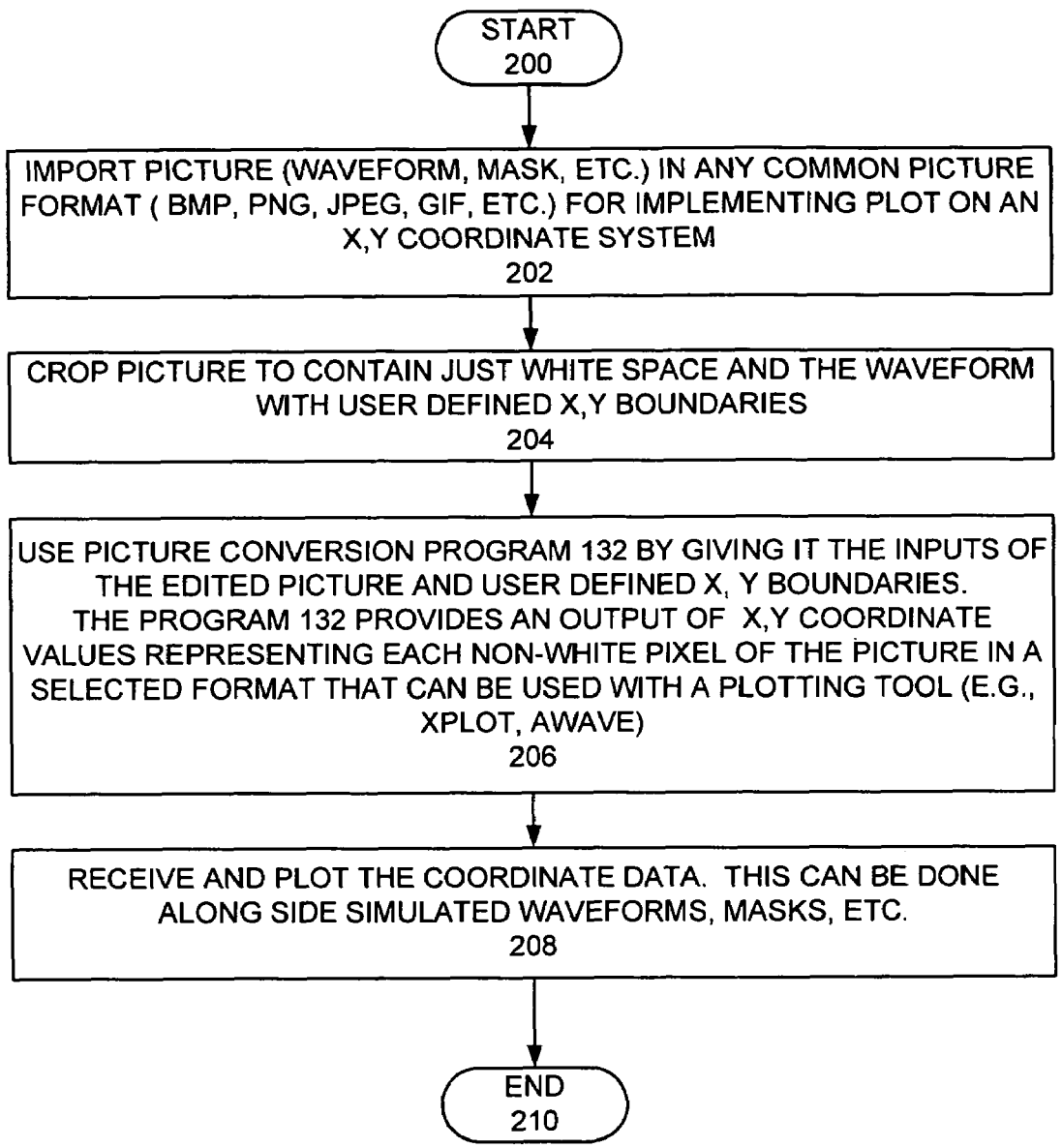
FIG. 2 is a flow chart illustrating exemplary steps for implementing picture format conversion to X,Y plot in accordance with the preferred embodiment; and in accordance with the preferred embodiment.

Referring now to FIG. 2, there are shown exemplary steps of methods for implementing picture format conversion to X,Y plot for waveform comparison starting at a block 200.

As indicated in a block 202, the picture conversion software program 132 imports or receives a picture of a waveform, a mask or the like in a standard picture format, for example, in a black and white bitmap (BMP) format, or in any other conventional picture format, such as, a portable network graphics (PNG) format, a Joint Photographic Experts Group (JPEG) format, a Graphics Interchange Format (GIF) format, and the like.

Next the input picture is edited or cropped to contain just white space and the waveform with known X,Y boundaries as indicated in a block 204. As indicated in a block 206, the picture conversion program 132 receives the edited picture and user defined X starting and stopping points, left and right side boundaries of the supplied picture in time, and user defined Y starting and stopping points, bottom and top side boundaries of the supplied picture in Voltage.

As indicated in block 206, the picture conversion program 132 gives as output a file that contains an (X,Y) point for each pixel based upon the supplied waveform and boundaries. At block 206, the output file is generated assuming a linear increase from left to right and from top to bottom.

This output file can be made in many different forms based upon a particular plotting program to be used with the X,Y data. The output file is then used to plot the X,Y data as indicated in a block 208, for example, along-side of a simulated waveform so that it is easy to determine how well the real hardware correlates to any simulated waveforms.

In one tested implementation, a user saves a picture in a black and white BMP format. The black color is assumed to be the wanted waveform. The user can then use the picture conversion software program 132 to convert the picture in black and white BMP format into a Common Simulation Data Format (CSDF) file format. There is also a currently available program to convert the CSDF file into a raw data file. This allows plotting the picture using either of two popular tools, aWaves (CSDF) or 'xplot' (RAW) by itself, or along with other data to be compared with the converted picture plot.

Figure 3:
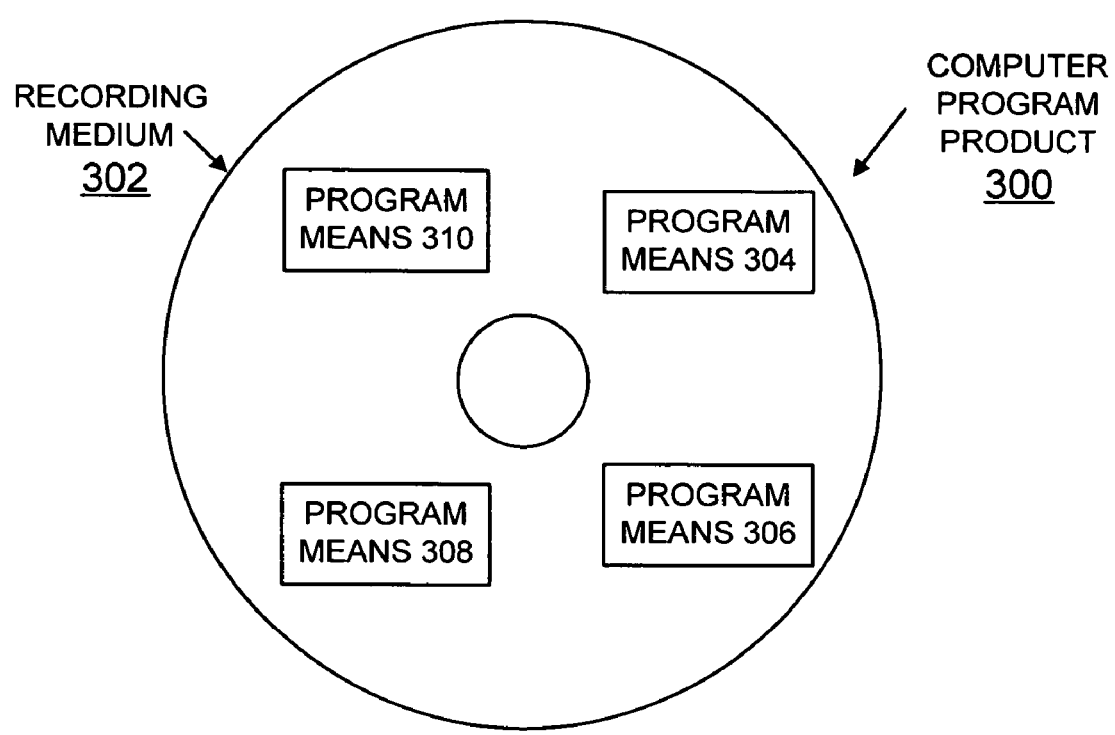
FIG. 3 is a block diagram illustrating a computer program product in accordance with the preferred embodiment.

Referring now to FIG. 3, an article of manufacture or a computer program product 300 of the invention is illustrated. The computer program product 300 includes a recording medium 302, such as, a floppy disk, a high capacity read only memory in the form of an optically read compact disk or CD-ROM, a tape, a transmission type media such as a digital or analog communications link, or a similar computer program product. Recording medium 302 stores program means 304, 306, 308, 310 on the medium 302 for carrying out the methods for implementing picture format conversion to X,Y plot of the preferred embodiment in the system 100 of FIGS. 1A and 1B.

A sequence of program instructions or a logical assembly of one or more interrelated modules defined by the recorded program means 304, 306, 308, 310, direct the computer system 100 for implementing picture format conversion to X,Y plot of the preferred embodiment.

While the present invention has been described with reference to the details of the embodiments of the invention shown in the drawing, these details are not intended to limit the scope of the invention as claimed in the appended claims.

What is claimed is:

1. A method for implementing picture format conversion to X,Y plot comprising the steps of:
   receiving a picture file and user selected X,Y boundaries;
   cropping the received picture file to contain only white space and a waveform within said user selected X,Y boundaries;
   converting non-white pixels of the cropped picture file between the user selected X,Y boundaries to X,Y coordinate values in a selected format; and
   plotting the converted X,Y coordinate values.

2. A method for implementing picture format conversion to X,Y plot as recited in claim 1 wherein receiving a picture file includes receiving the picture file having a predefined picture format.

3. A method for implementing picture format conversion to X,Y plot as recited in claim 2 wherein the predefined picture format includes one of a bitmap (BMP) format, a portable network graphics (PNG) format, a Joint Photographic Experts Group (JPEG) format, and a Graphics Interchange Format (GIF) format.

4. A method for implementing picture format conversion to X,Y plot as recited in claim 1 wherein the selected format for the converted X,Y coordinate values includes one of a raw data file (RAW) format, and a Common Simulation Data Format (CSDF).

* * * * *